US009353781B2

(12) United States Patent
Morgan (10) Patent No.: US 9,353,781 B2
(45) Date of Patent: May 31, 2016

(54) SLEW DRIVE GEARBOX AND CLAMP (71) Applicant: Brent Morgan, Phoenix, AZ (US)

(72) Inventor: Brent Morgan, Phoenix, AZ (US)

(*) Notice: Subject to any disclaimer, the term of this patent is extended or adjusted under 35 U.S.C. 154(b) by 9 days.

(21) Appl. No.: 14/490,578

(22) Filed: Sep. 18, 2014

(65) Prior Publication Data
US 2015/0082924 A1 Mar. 26, 2015

Related U.S. Application Data (60) Provisional application No. 61/880,101, filed on Sep. 19, 2013, provisional application No. 61/884,389, filed on Sep. 30, 2013.

(51) Int. Cl.
*F16B 7/04* (2006.01)
*F24J 2/54* (2006.01)
*F16H 19/08* (2006.01)
*F16H 57/039* (2012.01)
*F16B 2/14* (2006.01)
*F24J 2/46* (2006.01)

(52) U.S. Cl.
CPC .............. *F16B 7/0493* (2013.01); *F24J 2/541* (2013.01); *H02S 20/32* (2014.12); *F16B 2/14* (2013.01); *F16H 19/08* (2013.01); *F16H 57/039* (2013.01); *F24J 2002/4663* (2013.01); *F24J 2002/5462* (2013.01); *Y02E 10/47* (2013.01); *Y10T 74/18792* (2015.01)

(58) Field of Classification Search
USPC ............................................... 403/374.3, 367
See application file for complete search history.

(56) References Cited

U.S. PATENT DOCUMENTS

| 1,629,113 A * | 5/1927 | Maier ...................... F16B 3/00 403/367 |
| 6,860,672 B2 * | 3/2005 | Kim ....................... E04C 5/165 403/109.5 |
| 7,645,087 B1 * | 1/2010 | Lin ........................ B62K 21/18 403/109.5 |
| 8,468,676 B2 * | 6/2013 | Kramer .................... H02K 1/28 29/525.11 |
| 2014/0338659 A1 * | 11/2014 | Corio ....................... F24J 2/541 126/714 |
| 2015/0316639 A1 * | 11/2015 | Russ ........................ F24J 2/541 250/203.4 |

* cited by examiner

*Primary Examiner* — William Kelleher
*Assistant Examiner* — Randell J Krug
(74) *Attorney, Agent, or Firm* — Robert A. Parsons; Michael W. Goltry; Parsons & Goltry (57) ABSTRACT

A slew drive with clamp including a slew drive having a housing, a worm shaft having a worm thread carried within the housing for rotational movement, a torque tube having an outer diameter and a central socket extending therethrough, the torque tube carried by the housing for rotational movement perpendicularly to the worm shaft and worm thread, and coupling means for rotatably engaging the torque tube with the worm threads. A transverse support member is received in the socket and extends substantially perpendicularly therefrom. A clamp is carried within the socket movable between a clamped and an unclamped position for clamping the transverse member fixedly within the socket.

18 Claims, 9 Drawing Sheets

FIG. 13

SLEW DRIVE GEARBOX AND CLAMP

CROSS-REFERENCE TO RELATED APPLICATION

This application claims the benefit of U.S. Provisional Application No. 61/880,101, filed 19 Sep. 2013 and U.S. Provisional Application No. 61/884,389, filed 30 Sep. 2013.

FIELD OF THE INVENTION

This invention relates to solar panel support frameworks.
More particularly, the present invention relates to Slew drive gearboxes.

BACKGROUND OF THE INVENTION

In the field of drive systems, and in particularly slewing drives, the ability to attach a transverse support member is unknown. Previous drives have required specialized coupling members or brackets to enable attachment of structures thereto. These structures have also require modification to couple to the specialized coupling members. Each of these requires time and effort, increasing cost.

It would be highly advantageous, therefore, to remedy the foregoing and other deficiencies inherent in the prior art.

An object of the present invention is to provide a new and improved slew drive with clamp.

Another object of the invention is to provide a coupling mechanism for receiving and retaining a transverse support member in a slew drive.

A further object of the [present invention is to provide a slew drive with a clamp for simplifying installations, and reducing the time of installation, the cost and the weight.

SUMMARY OF THE INVENTION

Briefly, to achieve the desired objects and advantages of the instant invention provided is a slew drive with clamp. The slew drive includes a housing, a worm shaft having a worm thread carried within the housing for rotational movement, and a torque tube having an outer diameter and a central socket extending therethrough. The torque tube is carried by the housing for rotational movement perpendicularly to the worm shaft and worm thread. Coupling means is provided for rotatably engaging the torque tube with the worm threads, whereby rotation of the worm shaft rotates the torque tube relative the housing. A transverse support member is received in the socket and extending substantially perpendicularly therefrom. A clamp is carried within the socket and movable between a clamped and an unclamped position for clamping the transverse member fixedly within the socket.

In a further aspect of the invention, the socket includes a cut-out formed at an outer periphery thereof and the clamp includes a clamp assembly carried by the cut-out. The clamp assembly is movable between a clamped position, engaging the transverse support element and the torque tube, and an unclamped position. The clamp assembly can include an expansion member received in the cut-out. The expansion member is movable between an expanded configuration and a contracted configuration.

In a specific aspect, the cut-out is formed at a corner of the socket. The clamp assembly includes a wedge member having an angled surface having an angle corresponding to the angle of the corner, and an opposing surface having a slot formed therein carrying the expansion member. The expansion member engages both the wedge member and the torque tube. The expansion member forces the angled surface against the transverse support element in the expanded position.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
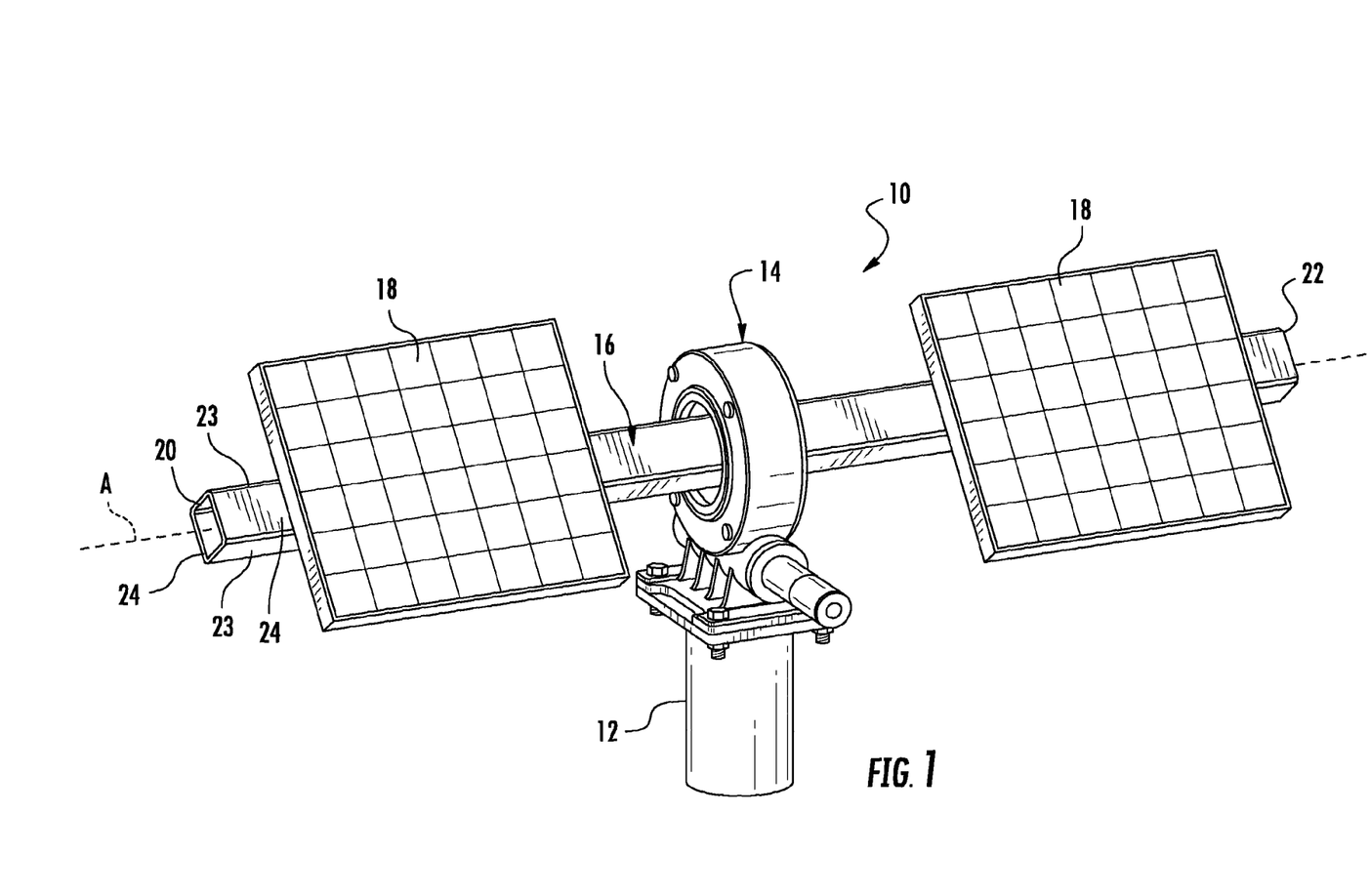
FIG. 1 is a perspective view of a solar panel assembly according to the present invention.
Figure 2:
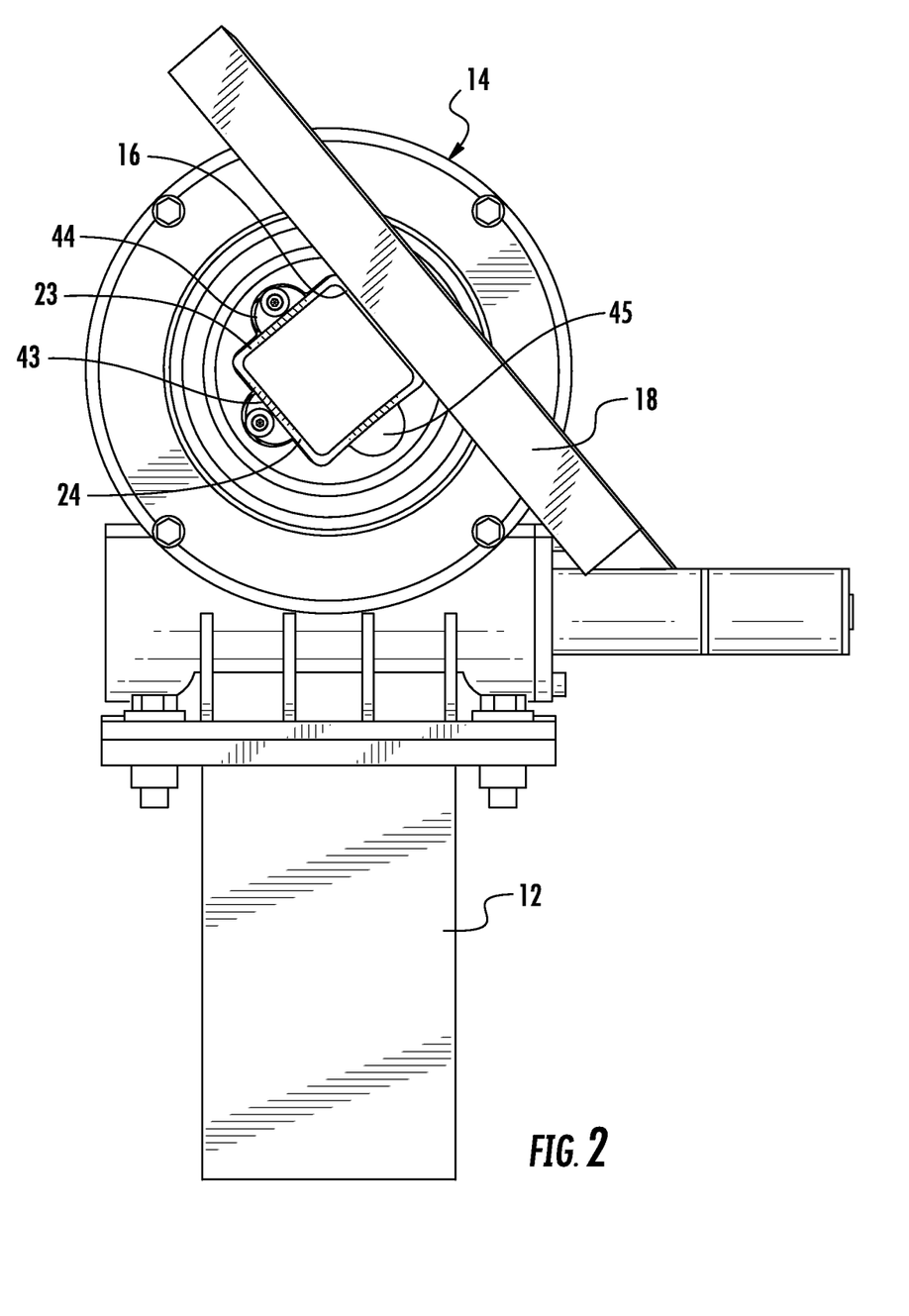
FIG. 2 is a perspective side view of the solar panel assembly of FIG. 1.

Turning now to the drawings in which like reference characters indicate corresponding elements throughout the several views, attention is directed to FIGS. 1 and 2 which illustrate a solar panel assembly generally designated 10. Assembly 10 includes a support post 12, a slew drive 14 carried by post 12, a transverse support member 16 extending through and rotated by slew drive 14, and solar panels 18 carried by transverse support member 16. Transverse support member 16 includes an end 20, and an opposing end 22 extending along a longitudinal axis A. In the preferred embodiment, transverse support member 16 is an elongated metal tube having a square cross section with opposed surfaces 23 extending from end 20 to opposing end 22 and opposed surface 24 extending from end 20 to opposing end 22. It will be understood that while transverse support member 16 is preferably tubular and metallic, it can also be a solid member, and can be made of wood, plastic and the like. Additionally, while a square cross section is preferred, any shape which can be fitted into a socket and held stable in relation thereto can be employed, such as hexagonal, triangular, rectangular, round oval and the like. Transverse support member 16 is carried by slew drive 14 at a midpoint between ends 20 and 22 to provide a weight balance between the ends. Solar panels 18 are coupled to transverse support member 16 intermediate slew drive 16 and end 20, and intermediate slew drive 16 and end 22. By rotating transverse support member 16 around longitudinal axis A, solar panels 18 can be adjusted to face the sun as it moves through the daytime sky, maximizing energy conversion. Furthermore, while the slew drive gear box and clamp are shown used in a solar panel assembly, it will be understood that the slew drive gearbox and clamp can be used in other application requiring rotation of a transverse support member.

Figure 3:
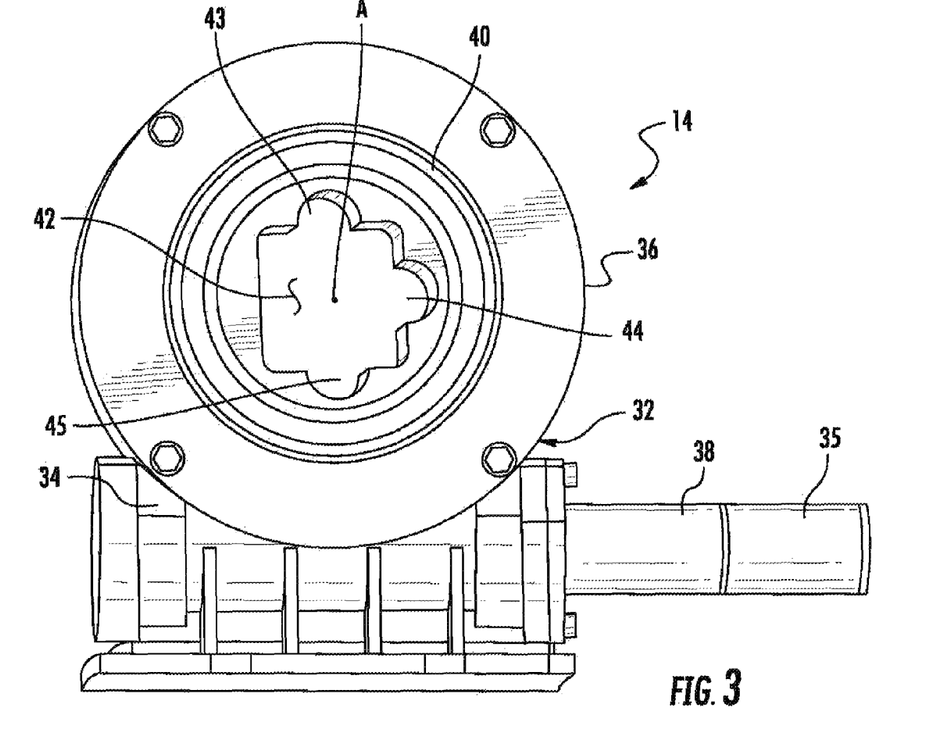
FIG. 3 is a perspective side view of a slew drive gearbox of the solar panel assembly of FIG. 1.

Turning now to FIG. 3, slew drive 16 is illustrated. Slew drive 16 has been described in detail in co-pending application entitled "SLEW DRIVE GEARBOX WITH TORQUE TUBE" Ser. No. 14/489,462, filed Sep. 17, 2014 and incorporated herein by reference. Slew drive 16 includes a housing 32 having a tubular portion 34 and an annular portion 36. Tubular portion 34 is coupled to annular portion 36. A drive motor 35 is coupled to an hourglass shaped worm thread (not shown), by a planetary gear assembly 38. Planetary gear assembly 38 is not described or shown in detail, as these assemblies are well known in the art. The worm thread is carried within tubular portion 34, and a portion thereof extends into annular portion 36. Drive motor 35 drives the worm thread which, in turn, drives a torque tube 40 carried by annular portion 36. Rotation of torque tube 40 around axis A, rotates transverse support member 16 and solar panels 18.

Still referring to FIG. 2, torque tube 40 defines a centrally located socket 42 therethrough. Socket 42, in this embodiment, is generally square shaped with semi-circular cut-outs 43, 44, and 45 formed on three sides. As discussed previously, shapes other than square can be employed to receive transverse support members of different cross sectional shape. Two adjacent cut-outs 43 and 44 are employed to carry clamp assemblies which will be described presently. The third cut-out 45 is employed as a via for wires and the like. It will be understood that any of the cut-outs can be used for receiving the clamp assemblies as long as those cut-outs are adjacent one another, or in other words, perpendicular to one another in this instance, or at an angle to one another when different shaped sockets are employed.

Figure 4:
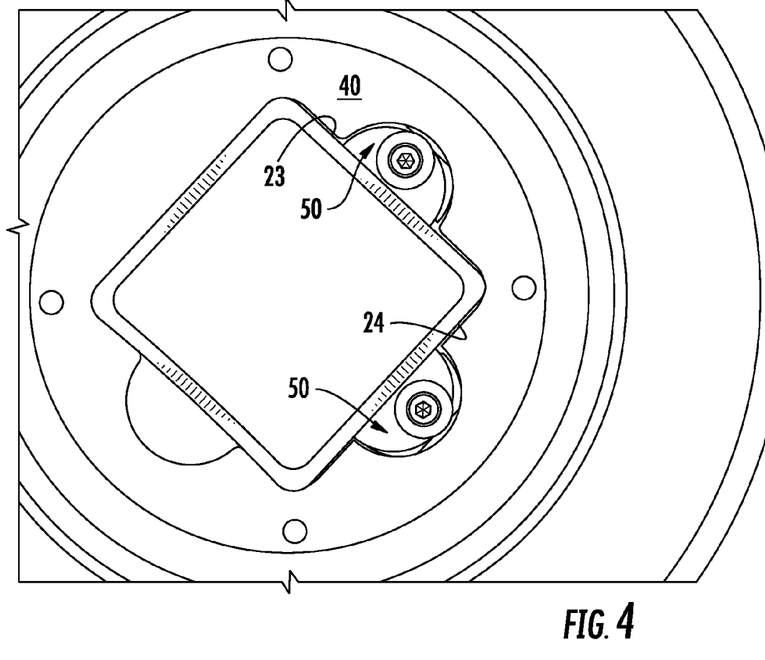
FIG. 4 is an enlarged view of a transverse support member secured within the torque tube.

Referring now to FIG. 4, an enlarged view of torque tube 40 is illustrated. Transverse support member 16 extends through socket 42 with one of surfaces 23 adjacent cut-out 43 and one of surfaces 24 adjacent cut-out 44. A clamp assembly 50 is carried by each of cut-outs 43 and 44, and each engage an inner surface of torque tube 40 defining cut-outs 43 and 44, and adjacent surfaces 23 and 24 of transverse support member 16. In the preferred embodiment, transverse support member 16 has a diameter less than the diameter of socket 42. This permits socket 43 to receive transverse support member 16 therethrough. To securely retain transverse support member in position, and prevent movement thereof relative toque tube 40, clamp assemblies 50 are used.

Figure 5:
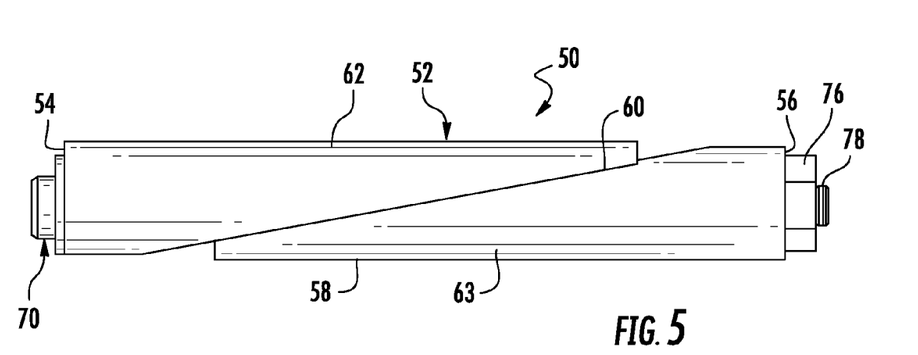
FIG. 5 is a side view of a clamp assembly.
Figure 6:
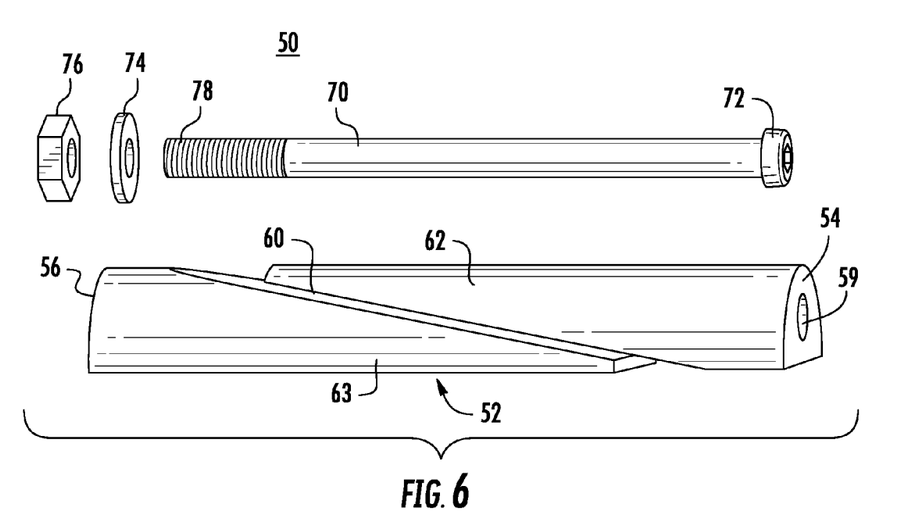
FIG. 6 is an exploded view of the clamp assembly of FIG. 1.

With reference to FIGS. 5 and 6, clamp assembly 50 is an expansion member which includes a cylindrical member 52 having opposed ends 54 and 56, a flattened side 58 extending between opposed ends 54 and 56, and a bore 59 extending along a longitudinal axis from end 54 to end 56. Cylindrical member 52 is separated by a division 60 into two portions 62 and 63 having a preferred 10 degree slope. A screw 70 extends through bore 59 from end 54 to end 56. A head 72 of screw 70 abuts end 54 and a washer 74 and nut 76 are threaded onto a threaded end 78 of screw 70 and abut end 56. In an unclamped position, cylindrical member 52 has a first diameter. In a clamp position, the distance between nut 76 and head 72 is reduced, sliding portion 62 and 63 at separation 60 inwardly, shortening the length of cylindrical member 52 and increasing the diameter of cylindrical member 52.

Figure 7:
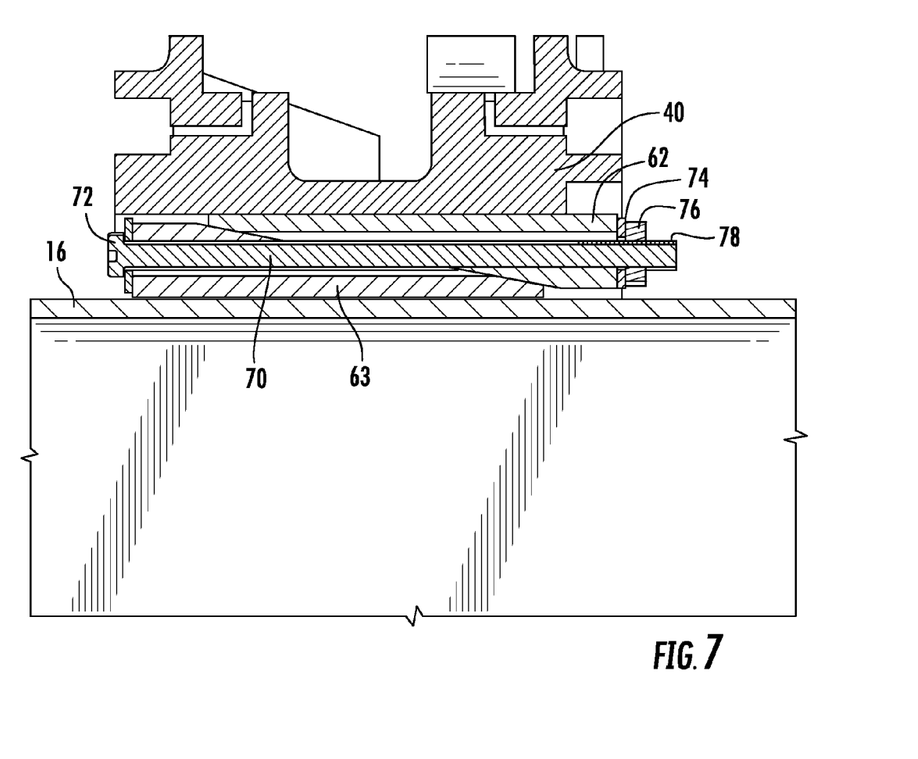
FIG. 7 is an enlarged sectional side view of a clamp member engaging a transverse support member and the torque tube.

With additional reference to FIG. 7, in the unclamped position, the reduced diameter of cylindrical member 52 permits its insertion and removal from cut-outs 43 and 44. In the clamped position, the expanded diameter of cylindrical member 52 tightly wedges clamp member 50 between torque tube 40 and transverse support member 16. Flattened side 58 is preferably oriented to lie flat against surfaces 23 and 24 of transverse support member 16. In this manner, transverse support member 16 can be rigidly secured within socket 42. This permits transverse support members having a diameter substantially less than the diameter of socket 42 to be held firmly in position. By employing two adjacent clamp members 50, transverse support member 16 is forced against the opposing sides of socket 42 along two axis, forcing a corner of transverse support member 16 into the opposing corner of socket 42.

Figure 8:
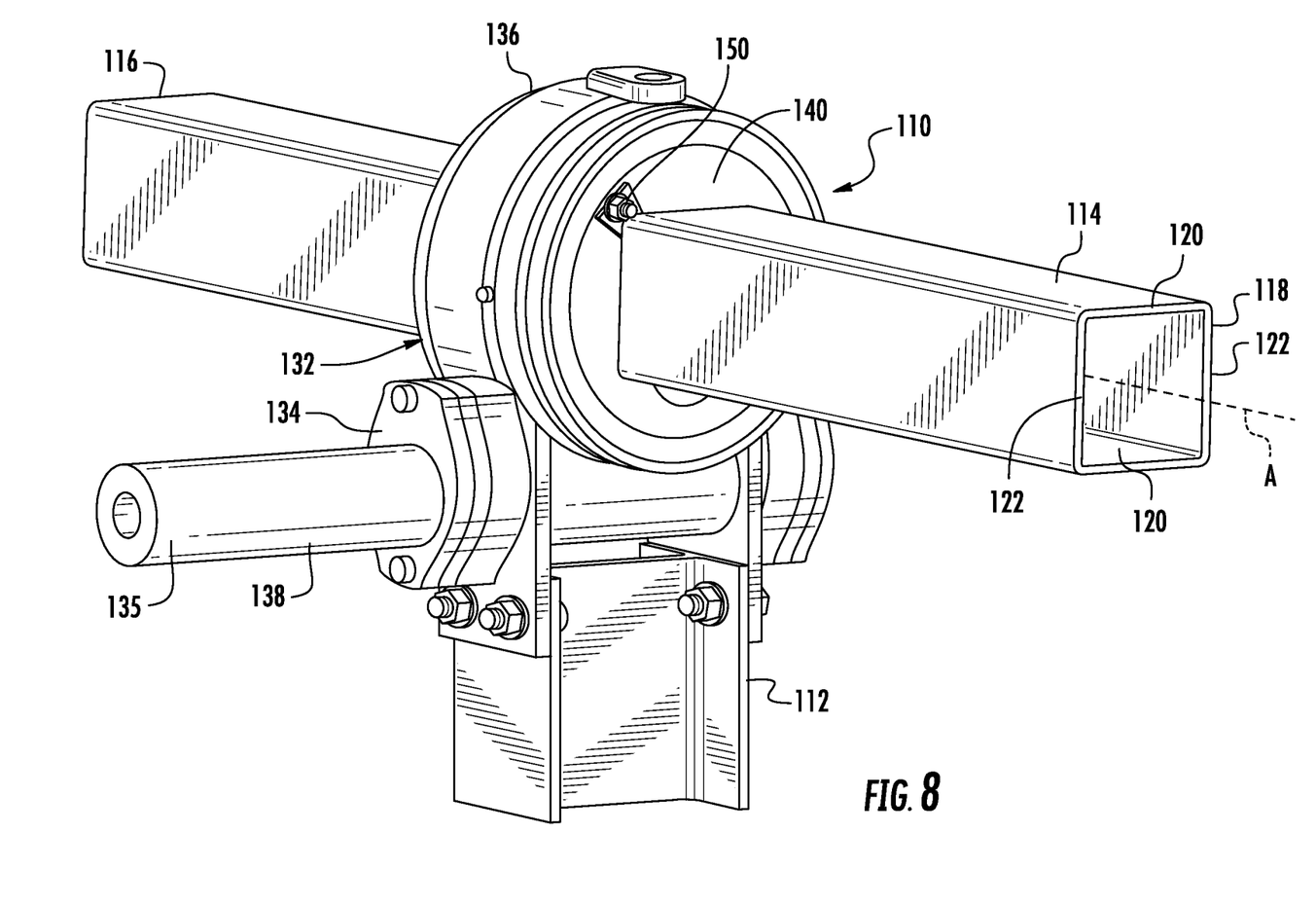
FIG. 8 is a perspective view of a slew drive gearbox with another embodiment of a clamp assembly and transverse support according to the present invention.
Figure 9:
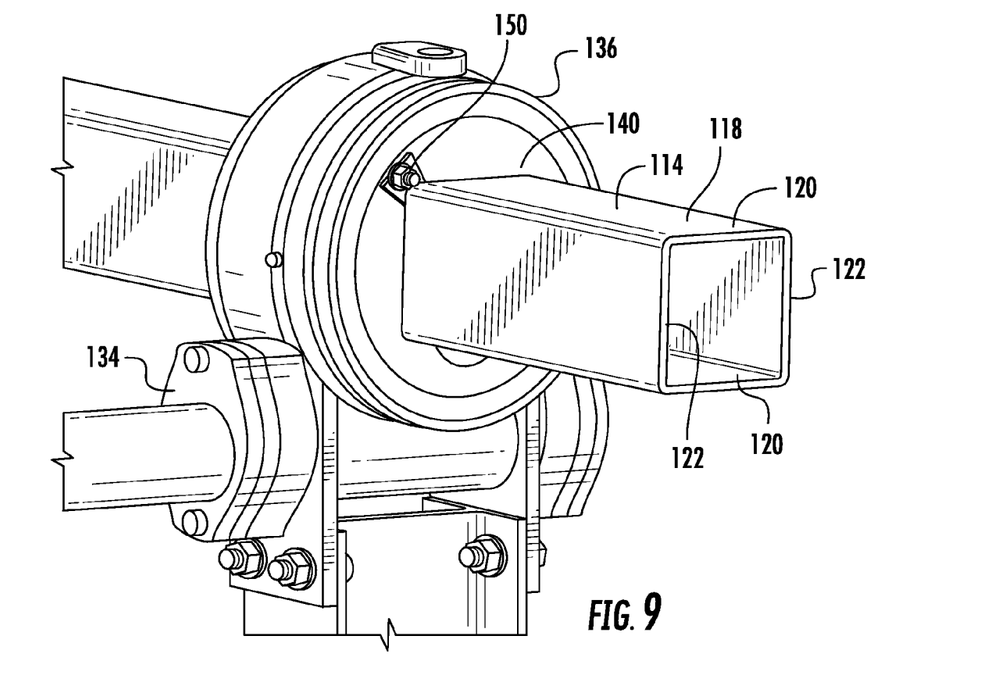
FIG. 9 is a perspective transparent view of a slew drive gearbox with clamp assembly and transverse support.

Turning now to FIGS. 8 and 9, another embodiment is illustrated showing a slew drive 110 carried by a post 112, and a transverse support member 114 extending through and rotated by slew drive 110. Transverse support member 114 includes an end 116, and an opposing end 118 extending along a longitudinal axis A. In the preferred embodiment, transverse support member 114 is an elongated metal tube having a square cross section with opposed surfaces 120 extending from end 116 to opposing end 118 and opposed surfaces 122 extending from end 116 to opposing end 118. It will be understood that while transverse support member 114 is preferably tubular and metallic, like that described in the previous embodiment it can also be a solid member, and can be made of wood, plastic and the like. In this particular embodiment, transverse support member 114 is carried by slew drive 110 at a point between ends 116 and 118. However, one skilled in the art will understand that support member 114 can extend from slew drive 110 in a single direction if desired. By rotating transverse support member 114 around longitudinal axis A, items attached to transverse support member 114 can be adjusted or rotated as desired.

Still referring to FIGS. 8 and 9, slew drive 114 has been described in detail in co-pending application entitled "SLEW DRIVE GEARBOX WITH TORQUE TUBE" Ser. No. 14/489,462, filed Sep. 17, 2014 and incorporated herein by reference. Slew drive 114 includes a housing 132 having a tubular portion 134 and an annular portion 136. Tubular portion 134 is coupled to annular portion 136. A drive motor 135 is coupled to a worm thread (not shown), by a planetary gear assembly 138. Planetary gear assembly 138 is not described or shown in detail, as these assemblies are well known in the art. The worm thread is carried within tubular portion 134, and a portion thereof extends into annular portion 136. Drive motor 135 drives the worm thread which, in turn, drives a torque tube 140 carried by annular portion 136. Rotation of torque tube 140 around axis A, rotates transverse support member 114.

Figure 10:
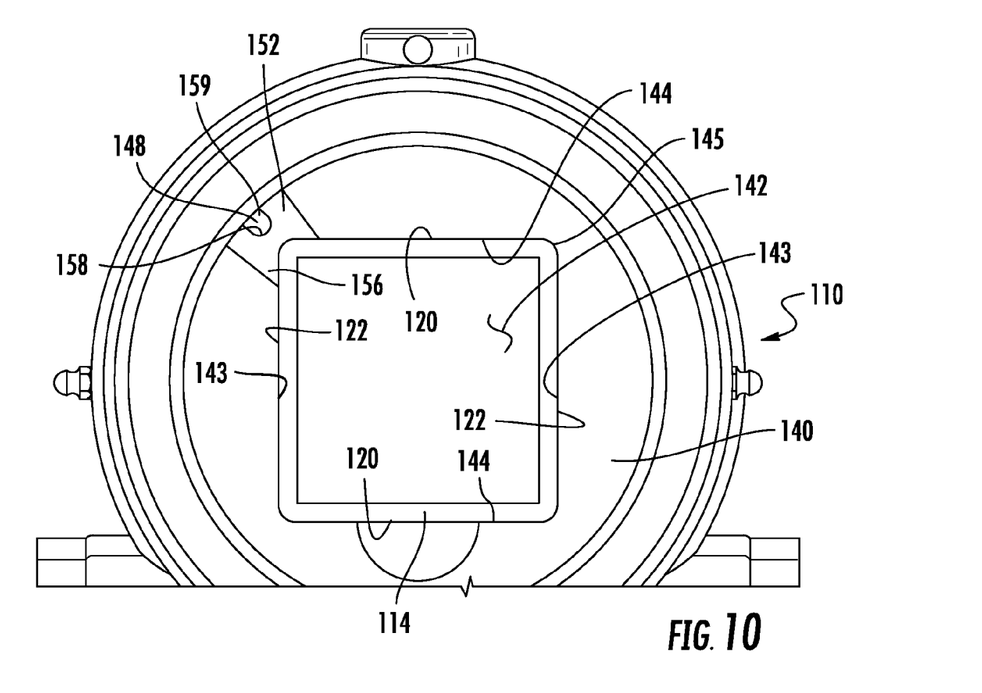
FIG. 10 is a plan view of the slew drive gearbox with clamp assembly and transverse support of FIG. 8.

With additional reference to FIG. 10, torque tube 140 defines a centrally located socket 142 therethrough. Socket 142, in this embodiment, is generally square shaped with opposed sides 143, and opposed sides 144, joined and corners 145. A cut-out 148 is formed in at least one of corners 145. Cut-out 148 is employed to carry a clamp assembly 150. It will be understood that more than one cut-out can be provided for receiving clamp assemblies. Additionally, while socket 142 is square in the preferred embodiment, other shapes having corners of different angles can be employed. For example, a hexagonal socket can be employed, in which case the sides adjacent sides thereof form corners of 120° as compared to the 90° corners of a square socket. The corners facilitate securing transverse support element in position and preventing axial rotation thereof. While a round transverse support element can be employed in a round socket, the clamping of the element will not be as secure. Also, while a transverse support element with corners is preferred, other shapes such as oval will also prevent axial rotation within an oval socket. In these instances, a cut-out would be formed in a side of the socket since no corners are present.

Still referring to FIG. 10, a plan view of slew drive 110 with torque tube 140 is illustrated. Transverse support member 114 extends through socket 142 with surfaces 120 adjacent surfaces 144 and surfaces 122 adjacent surfaces 143. A corner of transverse support member 114 is positioned adjacent cut-out 148. Clamp assembly 150 is carried by cut-outs 148, and engages an inner surface of torque tube 140 defining cut-out 148, and adjacent surfaces 120 and 122 of transverse support member 114. In the preferred embodiment, transverse support member 114 has a diameter less than the diameter of socket 142. This permits socket 142 to receive transverse support member 114 therethrough. To securely retain transverse support member 114 in position, and prevent movement thereof relative torque tube 140, clamp assembly 150 is used.

Figure 11:
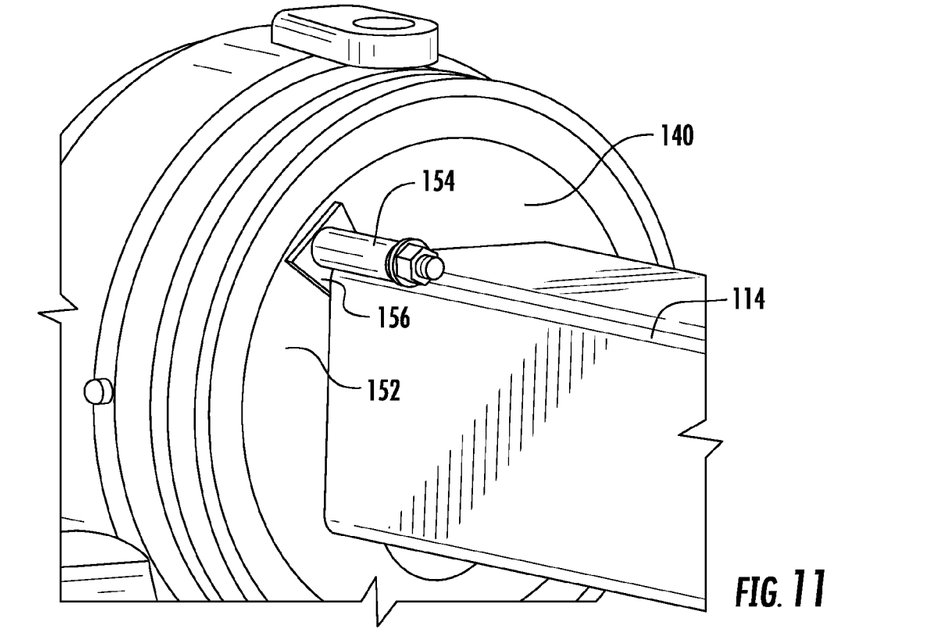
FIG. 11 is a perspective side view of a slew drive gearbox with partially inserted expansion member.

Clamp assembly 150 includes a wedge member 152 and an expansion member 154. Wedge member 152 includes a surface 156 forming a right angle and an opposing surface 158 having a slot 159 formed therein. With specific reference to FIG. 10, wedge member 152 can be seen inserted into cut-out 148, with surface 156 directed into socket 142 and surface 158 directed outwardly from socket 142. With momentary reference to FIG. 11, with transverse member 116 extending through socket 142 and wedge member 152 in position, expansion member 154 can be inserted into slot 159 engaging both wedge member 152 and torque tube 140. It should be understood that while two wedge members and two expansion members are shown, each inserted into opposing sides of torque tube 140, a single wedge member can extend entirely through torque tube 140.

Figure 12:
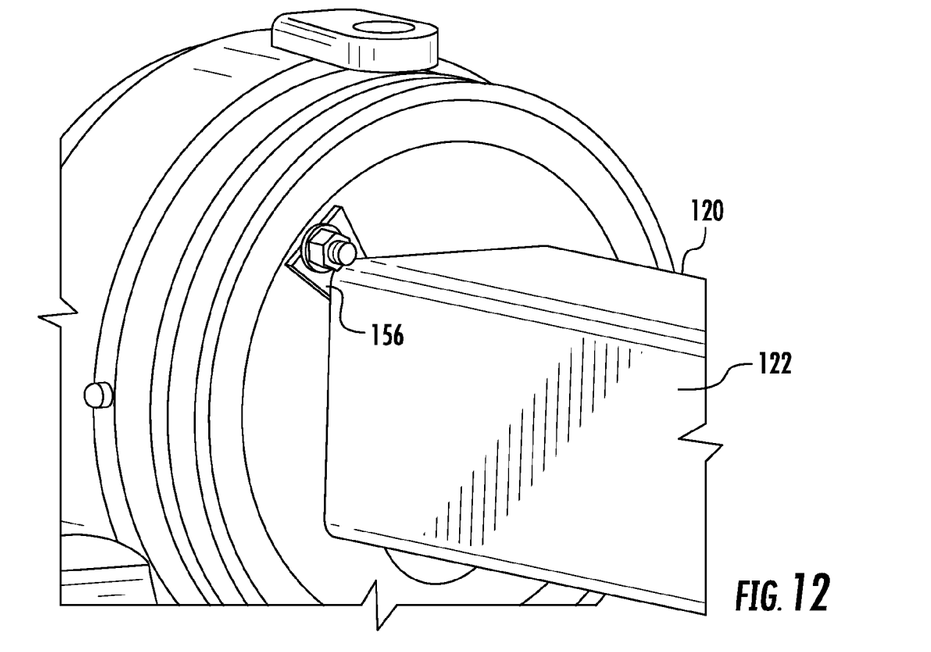
FIG. 12 is a perspective side view of a slew drive gearbox with fully installed clamp assembly.

Turning to FIG. 12, clamp assembly 150 is positioned and transverse support member 114 is fixed in position. Surface 156 abuts transverse support member 114, contacting both surface 120 and surface 122. By moving expansion member 154 from a contracted position to an expanded position forces wedge member 152 radially inwardly against transverse support member 114. Thus, surface 156 engages a corner of transverse support member 114, locking it in position using two axis.

Figure 13:
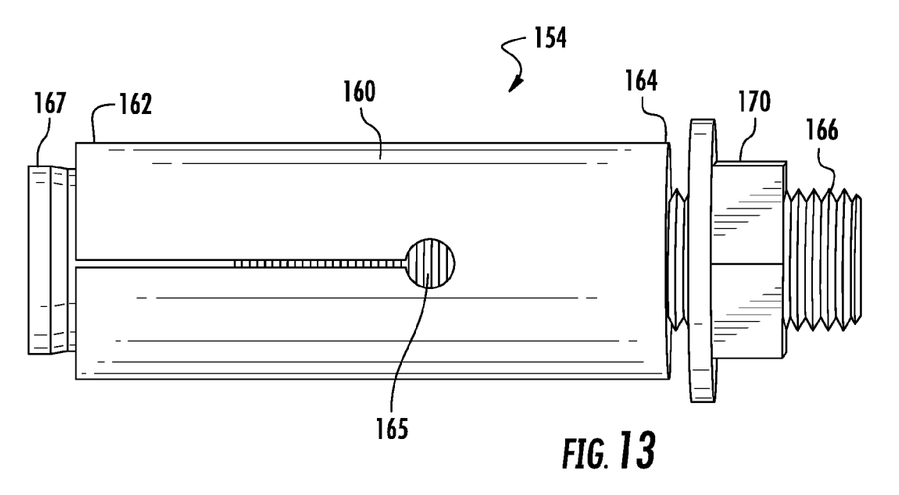
FIG. 13 is an enlarged perspective view of an expansion member.

Referring now to FIG. 13, expansion member 154 includes a bifurcated housing 160 being generally tubular and having an expanding end 162 and an end 164. A plug 165 having a threaded end 166 and a wedge end 167 extends through housing 160, with threaded end 166 extending outwardly from end 165 and wedge end 167 extending outwardly from and engaging expanding end 162. Wedge end 167 is tapered with a reduced diameter (smaller than an inner diameter of housing) adjacent expanding end 162 and has an incrementally enlarging diameter extending outwardly from expanding end 162. As wedge end 167 is pulled into expanding end 162 by tightening a nut 170 on threaded end 166, housing 160 expands (from a contracted position to an expanded position) at its bifurcation to accommodate the gradually enlarging diameter of wedge end 167. The expansion of expansion end 162 forces wedge member 152 radially inwardly against the corner of transverse support member 114, rigidly holding it in position relative torque tube 140.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A slew drive with clamp comprising:
 a slew drive including:
  a housing;
  a worm shaft having a worm thread carried within the housing for rotational movement;
  a torque tube having an outer diameter and a central socket extending therethrough, the torque tube carried by the housing for rotational movement perpendicularly to the worm shaft and worm thread; and
  coupling means for rotatably engaging the torque tube with the worm threads;
  whereby rotation of the worm shaft rotates the torque tube relative the housing;
 a transverse support member received in the socket and extending substantially perpendicularly therefrom; and
 a clamp carried within the socket movable between a clamped and an unclamped position for clamping the transverse member fixedly within the socket
 wherein the socket includes a cut-out formed at an outer periphery thereof and the clamp includes a clamp assembly carried by the cut-out, the clamp assembly movable between a clamped position, engaging the transverse support element and the torque tube, and an unclamped position.

2. The slew drive with clamp as claimed in claim 1 wherein the transverse support member has an end and an opposing end, the transverse support member extends through the socket of the slew drive along a longitudinal axis with the slew drive positioned intermediate the end and the opposing end, and a first solar panel carried by the transverse support member proximate the end, and a second solar panel carried by the transverse support member proximate the opposing end, whereby rotating the transverse support member around the longitudinal axis rotates the first solar panel and the second solar panel.

3. The slew drive with clamp as claimed in claim 1 wherein the coupling means is a ring gear section carried by the torque tube, the ring gear section having teeth extending beyond the outer diameter of the torque tube and engaging the worm threads.

4. The slew drive with clamp as claimed in claim 1 wherein the clamp assembly comprises an expansion member received in the cut-out, the expansion member movable between an expanded configuration and a contracted configuration.

5. The slew drive with clamp as claimed in claim 4 wherein the socket includes another cut-out, the cut-out and the another cut-out formed in adjacent sides of the socket, the clamp further includes another clamp assembly carried by the another cut-out, the another clamp assembly movable between a damped position, engaging the transverse support element and the torque tube, and an unclamped position.

6. The slew drive with clamp as claimed in claim 4 wherein the cut-out is formed at a corner of the socket.

7. The slew drive with clamp as claimed in claim 6 wherein the clamp assembly further comprises a wedge member having an angled surface having angle corresponding to an angle of the corner, and an opposing surface having a slot formed therein carrying the expansion member, the expansion member engaging both the wedge member and the torque tube, the expansion member forcing the angled surface against the transverse support element in the expanded position.

8. A slew drive with clamp comprising:
a slew drive including:
a housing;
a worm shaft having a worm thread carried within the housing for rotational movement;
a torque tube having an outer diameter and a central socket extending therethrough, the torque tube carried by the housing for rotational movement perpendicularly to the worm shaft and worm thread;
a cut-out formed at an outer periphery of the socket of the torque tube; and
coupling means for rotatably engaging the torque tube with the worm threads;
whereby rotation of the worm shaft rotates the torque tube relative the housing;
a transverse support member received in the socket and extending substantially perpendicularly therefrom; and
a clamp assembly carried within the cut-out of the socket and movable between a clamped and an unclamped position for clamping the transverse member fixedly within the socket along two axis.

9. The slew drive with clamp as claimed in claim 8 wherein the clamp assembly comprises an expansion member received in the cut-out, the expansion member movable between an expanded configuration and a contracted configuration.

10. The slew drive with clamp as claimed in claim 8 wherein the socket includes another cut-out, the cut-out and the another cut-out formed in adjacent sides of the socket, the clamp further includes another clamp assembly carried by the another cut-out, the another clamp assembly movable between a damped position, engaging the transverse support element and the torque tube, and an unclamped position.

11. The slew drive with clamp as claimed in claim 8 wherein the cut-out is formed at a corner of the socket.

12. The slew drive with clamp as claimed in claim 11 wherein the clamp assembly further comprises a wedge member having an angled surface having an angle corresponding to an angle of the corner, and an opposing surface having a slot formed therein carrying the expansion member, the expansion member engaging both the wedge member and the torque tube, the expansion member forcing the angled surface against the transverse support element in the expanded position.

13. The slew drive with clamp as claimed in claim 8 wherein the transverse support member has an end and an opposing end, the transverse support member extends through the socket of the slew drive along a longitudinal axis with the slew drive positioned intermediate the end and the opposing end, and a first solar panel carried by the transverse support member proximate the end, and a second solar panel carried by the transverse support member proximate the opposing end, whereby rotating the transverse support member around the longitudinal axis rotates the first solar panel and the second solar panel.

14. The slew drive with clamp as claimed in claim 8 wherein the coupling means is a ring gear section carried by the torque tube, the ring gear section having teeth extending beyond the outer diameter of the torque tube and engaging the worm threads.

15. A slew drive with clamp comprising:
a slew drive including:
a housing;
a worm shaft having a worm thread carried within the housing for rotational movement;
a torque tube having an outer diameter and a central socket extending therethrough for receiving a transverse support member, the torque tube carried by the housing for rotational movement perpendicularly to the worm shaft and worm thread; and
a ring gear section carried by the torque tube, the ring gear section having teeth extending beyond the outer diameter of the torque tube and engaging the worm threads;
whereby rotation of the worm shaft rotates the torque tube relative the housing; and
a clamp carried within the socket movable between a clamped and an unclamped position for clamping the transverse member fixedly within the socket
wherein the clamp comprises:
a cut-out formed at an outer periphery of the socket;
an expansion member received in the cut-out, the expansion member movable between an expanded configuration and a contracted configuration.

16. The slew drive with clamp as claimed in claim 15 wherein the clamp further comprises:
another cut-out formed at the outer periphery of the socket, the cut-out and the another cut-out formed in adjacent sides of the socket; and
another expansion member received in the another cutout, the another expansion member movable between an expanded configuration and a contracted configuration.

17. The slew drive with clamp as claimed in claim 15 wherein the cut-out is formed at a corner of the socket.

18. The slew drive with clamp as claimed in claim 17 wherein the clamp further comprises a wedge member having an angled surface having an angle corresponding to the angle of the corner, and an opposing surface having a slot formed therein carrying the expansion member, the expansion member engaging both the wedge member and the torque tube, the expansion member for forcing the angled surface against the transverse support element in the expanded position.

* * * * *